United States Patent [19]
Hirsh et al.

[11] Patent Number: 6,040,857
[45] Date of Patent: Mar. 21, 2000

[54] PHASE-NOISE TYPE BROAD SPECTRAL BANDWIDTH OPTICAL LOW-PASS ANTI-ALIASING FILTER

[75] Inventors: Jeffrey I. Hirsh; Joseph F. Revelli, Jr.; Alan C. G. Nutt, all of Rochester, N.Y.

[73] Assignee: Eastman Kodak Company, Rochester, N.Y.

[21] Appl. No.: 08/863,648

[22] Filed: May 27, 1997

[51] Int. Cl.$^7$ .................................................. H04N 5/217
[52] U.S. Cl. ............................................ 348/241; 348/342
[58] Field of Search .................................... 348/272, 335, 348/340, 342; 358/513; 359/738, 599

[56] References Cited

U.S. PATENT DOCUMENTS

| | | | |
|---|---|---|---|
| 2,959,105 | 11/1960 | Sayanagi. | |
| 4,009,939 | 3/1977 | Okano | 350/162 |
| 4,480,896 | 11/1984 | Kubo et al. | 350/431 |
| 4,989,959 | 6/1989 | Plummer | 350/447 |
| 5,189,454 | 2/1990 | Yamazaki et al. | 354/200 |
| 5,280,388 | 1/1994 | Okayama et al. | 359/569 |
| 5,438,366 | 11/1994 | Jackson et al. | 348/342 |
| 5,585,885 | 12/1996 | Muramatsu | 396/111 |
| 5,684,293 | 11/1997 | Kessler | 250/208.1 |

OTHER PUBLICATIONS

Sayanagi, Optical Noise Filter, J. Appl. Phys. (Japan) 27, 623–632, 10, 1958.

Okano, Optical Phase–Noise Filter for Color Portrait Photography, Proc. IOC (International Commission for Optics) 13th Conference Digest, Sapporo, Japan, 1984.

*Primary Examiner*—Tuan Ho
*Assistant Examiner*—Eric Ferguson
*Attorney, Agent, or Firm*—Raymond L. Owens

[57] ABSTRACT

A device is described for a very low cost anti-aliasing filter to be used to suppress aliasing artifacts present in discretely sampled solid-state electronic imaging devices. This device includes a transparent substrate upon which a multiplicity of transparent phase spots are placed. The diameter and thickness of the transparent phase spots are designed in such a way to cause just the right amount of blurring to suppress the aliasing artifacts, yet render a reasonable sharp image for spatial frequencies below the sampling frequency of the imager. This suppression is further accomplished over a broad spectral range. The phase noise filter thus formed can be placed either in object space or in image space.

13 Claims, 8 Drawing Sheets

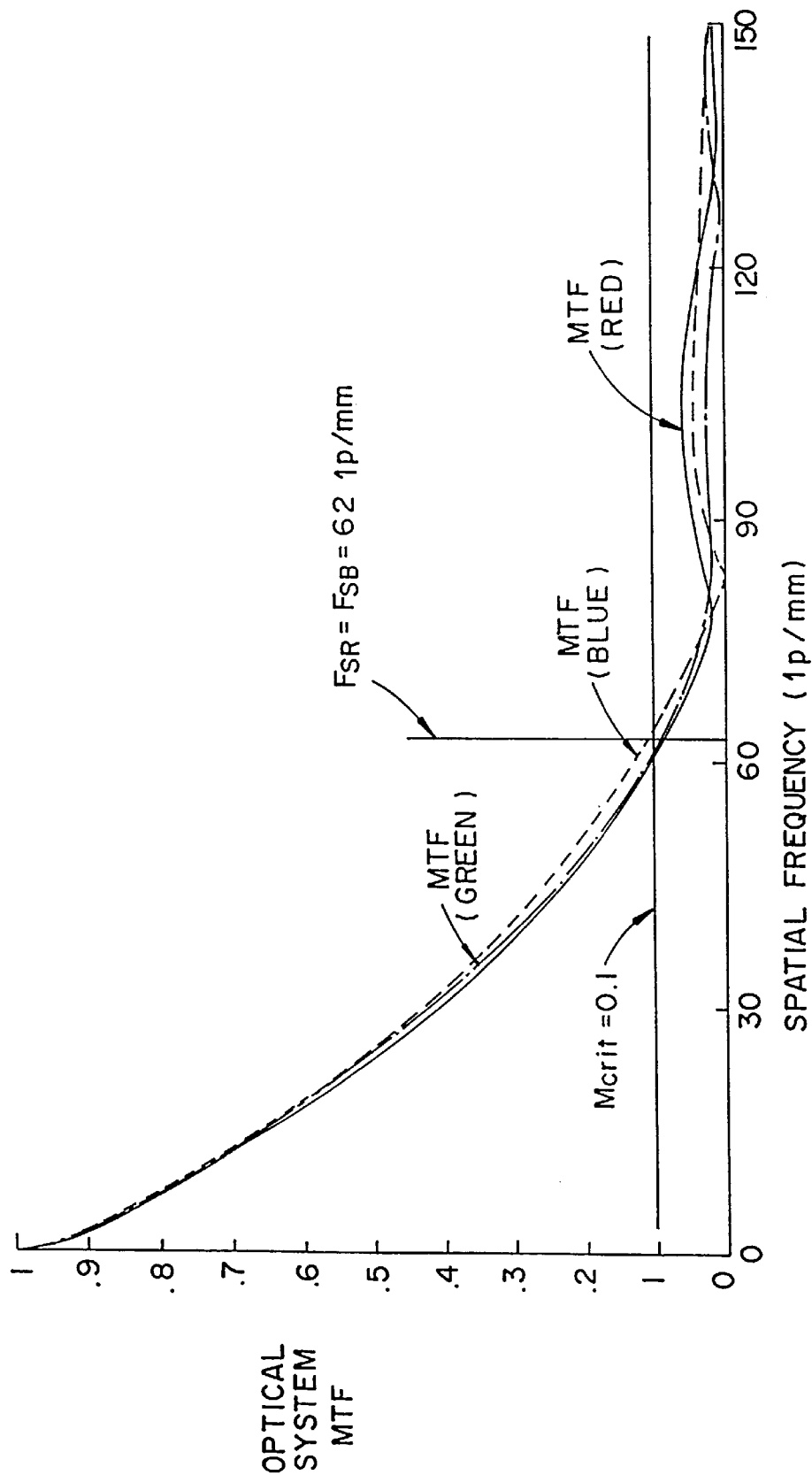

PHASE-NOISE TYPE BROAD SPECTRAL BANDWIDTH OPTICAL LOW-PASS ANTI-ALIASING FILTER

FIELD OF THE INVENTION

The present invention relates to an optical low-pass filter to reduce or eliminate high spatial frequencies over a broad spectral bandwidth in order to minimize aliasing artifacts due to discrete sampling of images in image capture devices, such as electronic still cameras with monochromatic or color sensors or single sensor element color video cameras, while at the same time maintaining highest possible resolution.

BACKGROUND OF THE INVENTION

Solid-state image capture devices such as electronic still cameras and the like rely on an array of discrete light sensitive elements or photosites known as pixels to spatially sample an image of the object and produce sampled output. Because the image is sampled in a discrete manner, images re-created contain false signal content not present in the original object. This phenomenon is known as aliasing and becomes noticeable for those spatial frequency components of the image which are equal to half the spatial sampling frequency along a particular direction of the pixel array, the so-called Nyquist frequency. Although aliasing begins to appear at Nyquist frequency, it is most pronounced at spatial frequencies that are close to the sampling frequency along the given direction of the solid state imager. The effects of aliasing in a monochrome imager (i.e., an imager with no color filter array) with discrete sampling can be seen by reference to FIG. 1 and FIG. 2. The test target shown in FIG. 1 is characterized by a series of concentric rings such that the spatial frequency increases linearly with radius from the center of the target. FIG. 2A is a schematic representation of an array of discrete pixels of a typical solid-state imager. The array has a pixel pitch T along the directions of the x- and y-axes and T/√2 along the diagonal directions. If this target is imaged on the discrete array of pixels in the imager, the aliasing pattern shown schematically in FIG. 2B is obtained. (Note that for the sake of clarity, the actual target image has been subtracted and the resultant schematic representation of the remaining aliasing artifact pattern is as shown in FIG. 2B.) It can be seen that, although the aliasing artifacts become evident at spatial frequencies at and above the imager Nyguist frequency ($F_N$=1/(2T) along the x- and y-axes and √2/(2T)) along the diagonal directions), the aliasing pattern is most pronounced in regions of the target image where the spatial frequency is equal to the sampling frequency ($F_S$=1/T along the x- and y-axes and √2/T) along the diagonal directions). In order to reduce or eliminate aliasing artifacts, then, it would be desirable to employ a broad spectral bandwidth optical low-pass, or blur, filter in the optical system which reduces or eliminates those spatial frequencies in the image plane above some cut-off frequency which lies between the Nyquist frequency and the sampling frequency along the direction of the imager for which the sampling frequency is lowest. It should be appreciated that in the case of a monochrome imager little or no information would be lost in a digital imaging system with such a filter in place since it is not possible theoretically to capture information contained in spatial frequencies above Nyquist frequency.

The situation becomes more complicated in the case of color electronic capture devices in which light incident on individual pixels is filtered by one of three primary color filters (i.e., red, green, and blue filters, for example). In many of these color image sensors the spatial sampling frequency for one color is different from the spatial sampling frequency for another; consequently, each color has associated with it a different Nyquist frequency along a given direction. FIGS. 3A and 3B illustrate the effects of aliasing for a typical color solid-state imager with discrete sampling. FIG. 3A is a schematic representation of an array of discrete pixels with green color filters (labeled "G" in FIG. 3A) on half of the pixels and red or blue color filters on the remaining half (labeled "R" or "B", respectively, in FIG. 3A). This particular color filter array pattern is often referred to as the "Bayer" pattern. The pitch of green pixels along the x- or y-axes, $T_G$, is the same as the pixel pitch T of the sensor while the pitches of the red or blue pixels along the x- or y-axes, $T_R$ and $T_B$, respectively, are equal to 2T. It should be noted that the pitches of the green, red, and blue pixels along diagonal directions are all equal to √2 T. It follows that the green pixel sampling frequency along the x- and y-axes is twice that of the red or blue pixels ($F_{SG}$=2$F_{SR}$=2$F_{SB}$=1/T). FIG. 3B is a schematic diagram indicating the positions of aliasing artifacts only (i.e., captured image minus the image of the test target) for the test target shown in FIG. 1. The most pronounced aliasing artifacts for red and blue pixels occur at spatial frequencies corresponding to the red and blue sampling frequencies along a given direction, whereas all three colors exhibit pronounced aliasing artifacts at spatial frequencies corresponding to the sampling frequency of the sensor. For these imagers it would be desirable to design a broad spectral bandwidth optical blur filter with a cut-off frequency which lies somewhere between the lowest Nyquist frequency (i.e., the red or blue Nyquist frequency along the x- or y-axes for the Bayer-type imager) and the highest sampling frequency (i.e., the sensor sampling frequency along the x- or y-axes). In this case, a trade-off must be made between the degree of aliasing suppression and the degree of image sharpness since information contained in those spatial frequencies of the image between the cut-off frequency of the optical blur filter and the highest Nyquist frequency (i.e., that associated with the green pixels along the x- or y-axes) will be lost.

Phase noise optical low pass filters have been disclosed in the literature for applications as photographic softening filters as well as anti-aliasing filters in digital cameras. See "Optical Noise Filter" by K. Sayanagi, *Journal of Applied Physics* (Japan), 26, No. 10, 1958, pp 623–632; and "Optical Phase-Noise Filter for Color Portrait Photography" by Y. Okano, *Proceedings of the International Commission for Optics*, 13th Conference Digest—Sapporo, Japan, 1984, pp 104–105. These articles describe a phase-noise optical low-pass filter formed by a transparent substrate 10 with a plurality of randomly positioned and mutually spaced transparent spots 11 each spot being of a thickness on the order of the wavelength of light passing through the filter as shown in FIG. 4A. FIGS. 4B and 4C show side views of the phase-type optical low-pass filters for cases where the randomly placed transparent spots are formed by projections from the surface of the transparent substrate (FIG. 4B) and alternatively by depressions in the surface of the transparent substrate (FIG. 4C).

When positioned between the objective lens and the image plane of the imaging system (see FIG. 5A) or directly in front of the objective lens (see FIG. 5B), such a phase noise-type low-pass optical filter causes aberrations in the wave front of the light passing through it. The modulation transfer function (MTF) due to the blur filter alone (i.e., excluding the effects of lens aberrations and finite aperture) can be derived from the auto-correlation of the randomly arrayed transparent spots where each spot introduces a phase difference $\phi_j$ relative to light passing through the substrate in regions without spots. The MTF at a particular optical wavelength $\lambda_j$, as a function of spatial frequency, is given as follows:

$$MTF(f, \lambda) = \left\{1 - [2\xi][1 - \cos\phi(\lambda)]\left[1 - g\left(\frac{\lambda bf}{2}\right)\right]\right\} \quad (1A)$$

where f is the spatial frequency, $\xi$ is the fractional area of the surface of the filter that is covered by the transparent spots, $$\phi(\lambda) = 2\pi\frac{n(\lambda) - n'(\lambda)}{\lambda}t, \quad (1B)$$

and $n(\lambda)$ is the index of refraction of the material forming the spots at the specific wavelength $\lambda$, $n'(\lambda)$ is the index of refraction of the medium surrounding the spots at the specific wavelength $\lambda$; and t is the physical thickness of the transparent spots. The function $g(\lambda bf/2)$ is the geometrical auto-correlation of the spots along a specific direction and has the properties $g(0)=1$ and $g(\lambda bf/2)=\xi$ for very large values of the argument $\lambda bf/2$. The function g depends implicitly on the phase spot diameter a in that the auto-correlation of the phase spots drops off more rapidly with spatial frequency when the phase spot diameter is smaller. The quantity b in EQN. (1A) is the distance between the spot-bearing surface of the phase noise filter and the image plane if the filter is placed in "image space" (i.e., the space between the imaging lens and the image plane). It becomes equal to the focal length of the imaging lens if the filter is placed in "object space" (i.e., the space between the imaging lens and the object) or within the imaging lens system itself.

FIG. 6 shows a plot of MTF(f,$\lambda$) for a particular wavelength. As can be seen, the function exhibits three distinct regions as the spatial frequency increases from f=0 1p/mm to very high spatial frequencies. In the low spatial frequency region (first region) MTF(f,$\lambda$) decreases monotonically with f until it reaches an intermediate spatial frequency region (second region) where the function begins a damped oscillation. The oscillations die out and the function approaches the asymptotic value $$M_c(\lambda) = \{1 - [2\xi][1 - \cos\phi(\lambda)][1-\xi]\} \quad (2)$$

as the spatial frequency becomes very large (third region), where $M_c(\lambda)$ is referred to as the MTF cut-off function. Although MTF(f,$\lambda$) approaches $M_c(\lambda)$ as f approaches infinity, there is a smaller finite value off for which MTF(f,$\lambda$)=$M_c(\lambda)$. This value of f marks the transition from the low (monotonically decreasing) to the intermediate (damped oscillatory) spatial frequency regions and is given by the expression $$F_a(\lambda) \equiv \frac{a}{\lambda b} \quad (3)$$

1 p/mm where $F_a(\lambda)$ is the canonical cut-off frequency of the filter. It should be appreciated that in order to reduce aliasing artifacts, it is desirable to design the phase noise filter so that the MTF is sufficiently small for spatial frequencies at or above the appropriate sampling frequency as discussed previously. From EQN. 2 it can be seen that $M_c(\lambda)=0$ can be obtained providing $\xi=0.5$ (i.e., the substrate surface has 50% spot coverage) and the physical thickness of spots is chosen be $$t = \frac{(2m+1)\lambda}{2(n(\lambda) - n'(\lambda))} \quad (4A)$$

which is the physical thickness that causes the phase difference due to the spots to become an odd multiple of $\pi$ radians, $$\phi(\lambda) = (2m+1)\pi. \quad (4B)$$

The quantity m in EQNS. 4A and 4B can be 0 or any positive or negative integer. Typically the filter canonical cut-off frequency $F_a(\lambda)$ is adjusted such that the MTF of the entire optical system (i.e., including lens) is sufficiently low at and above spatial frequencies where aliasing artifacts become problematic while simultaneously maintaining as high a value possible at spatial frequencies below Nyquist.

It is known to construct optical low-pass filters for the purposes of intentional image blurring. See for example, U.S. Pat. No. 4,480,896 which discloses a transparent random spot blur filter for use in portrait photography. In this patent, the value of t in EQN. 4A is chosen for a particular wavelength in the green region of the visible spectrum. This is done in order to cause maximum blurring for the wavelength at which the human is eye is most sensitive, thereby reducing the sharpness of undesirable features in portrait photographs such as facial blemishes. However, this patent suffers a serious disadvantage for anti-aliasing applications in electronic cameras since the green channel is precisely the one that carries most of the luminance information. Consequently it is important to retain as much resolution as possible in the green channel. On the other hand, no provision is made in this patent to blur the red and blue components of discretely sampled images in order to reduce aliasing for these color bands.

U.S. Pat. No. 2,959,105 is similar to the previously mentioned patent in that it discloses the use of a random spot phase noise filter in combination with an ordinary photographic lens to obtain "soft" focus in portrait photography. As a further objective this patent mentions the use of the phase noise filter as a spatial frequency cut-off device to produce continuous tone photographic images from any optical images of periodic structures such as screen dots or of line structures in television images, etc. This patent does not anticipate the adaptation of the phase noise filter to solve problems specifically associated with elimination of aliasing artifacts in modern solid-state electronic cameras with discrete sampling.

Another example from the prior art is U.S. Pat. No. 5,280,388 which describes a wavelength selective phase grating optical low-pass filter for use with electronic still cameras or other discretely sampling image capture devices. More specifically, the filter described in this patent is intended for use in color solid state image capture devices which incorporate color filter array patterns such as the Bayer pattern which sample more in the green portion of the visible spectrum than in the red or blue portions. In this patent, the randomly placed transparent spots are replaced by a regular two dimensional transparent phase grating pattern. Wavelength selectivity is accomplished by appropriately choosing the refractive indexes and the refractive index dispersions of the transparent phase grating material and the transparent material in which the phase grating is embedded such that the refractive indexes are matched for a particular wavelength in the green spectral band and mismatched in the red and blue spectral bands. That is to say $n(\lambda_G)$ and $n'(\lambda_G)$ in EQN. 1B are equal so that, according to EQN. 2, $M_c(\lambda_G)$ is equal to unity where $\lambda_G$ is a particular wavelength in the green spectral band. Furthermore the thickness of the stripes that form the phase grating is chosen so that, given the refractive index dispersion differences between the grating material and the material surrounding the grating, $M_c(\lambda)$ is sufficiently close to zero for certain wavelengths in the red and blue portions of the visible spectrum. This patent also suffers several disadvantages. First of all, the gratings must be aligned precisely to the array axes of the pixels which comprise imaging area of the solid state image capture device. This invention has the further disadvantage that special conditions are placed on the physical properties (i.e., index of refraction and dispersion) of the materials used to fabricate the low-pass filter. These properties are restrictive and may result in conflicts with other requirements such as the desire for low manufacture costs. The need to form two separate gratings oriented perpendicularly to one another also complicates the fabrication and adds to the expense of fabricating the device.

In addition to the specific problems mentioned in connection with each of the three prior art references already referenced, there is a fundamental problem which none of these patents address for applications involving anti-aliasing in electronic still cameras or other discretely sampled digital image capture devices. The difficulty can be understood most easily by referring to FIG. 7. This figure shows three hypothetical spectral sensitivity functions filters $S_R(\lambda)$, $S_G(\lambda)$, and $S_B(\lambda)$ that characterize the red, green, and blue channels, respectively, of a typical color digital image capture device. These spectral sensitify curves represent the response of each of the individual color channels to incident light as a function of wavelength. They include characteristics such as the spectral dependence of the quantum efficiency of the photo-diodes or photo-capacitors that comprise the individual pixels as well as the transmission characteristics of the color filters associated with the three color channels. For the purposes of the present invention, these spectral sensitivity curves also include the spectrum of the incident illumination. Since each of the spectral sensitivity curves contains wavelengths over a broad spectral band, the proper MTF of the blur filter at cut-off for a particular color filter must be obtained by a weighted average over the spectrum of that color channel. In the case of the phase noise blur filter, EQN. 2 must be spectrally averaged to yield $$M_{cR} \int = S_R(\lambda) M_c(\lambda) d\lambda \quad (5)$$

where $M_{cR}$ is the spectrally averaged MTF cut-off function for the red channel. Similar expressions are obtained for $M_{cG}$ and $M_{cB}$ for the green and blue color channels, respectively. According to EQN. 1B, the larger the thickness t of the transparent spots, the more the value of $\phi(\lambda)$ will vary over the wavelength band of a given channel. As a direct result of the variation of the phase difference over the bandwidth of the color channels, the values of $M_{cR}$, $M_{cG}$, and $M_{cB}$ will be significantly larger than zero. Consequently the phase noise blur filter will not be effective in reducing aliasing artifacts present in the captured image as t becomes larger. Not one of the three prior art patents referenced above solves the problem of aliasing suppression over broad spectra in color solid state digital cameras.

U.S. Pat. No. 4,009,939 relates to a wavelength selective low-pass optical filter that is used to eliminate aliasing artifacts in color television camera systems. This patent does disclose a way for solving the problem mentioned in connection with the previous prior art patents; that is, it addresses the problem of achieving aliasing suppression across broad spectral bandwidths. The filter is comprised of a first transparent phase grating, a second transparent phase grating, and a transparent substrate supporting the first and second phase gratings. Each phase grating is formed by a plurality of parallel transparent stripes or laminae such that the laminae of the respective first and second gratings are non-parallel to each other crossing at an angle between 90° and 160°. The thickness of the laminae in the first phase grating, $t_1$, and the second phase grating, $t_2$, are selected independently and in such a way that the first phase grating attenuates high spatial frequencies in the red spectrum and the second phase grating attenuates high spatial frequencies in the blue spectrum. Accordingly, the phase retardation of the laminae in the first grating, $\phi_1$, and the second grating, $\phi_2$, are such that the MTF of the optical imaging system which includes such a low-pass optical filter is sufficiently close to zero for the respective design wavelengths. In this case $\phi_1$ and $\phi_2$ are defined according to the formulae $$\phi_1 = \frac{2\pi}{\lambda_R}(n_1 - n')t_1 \quad (6A)$$

and $$\phi_2 = \frac{2\pi}{\lambda_B}(n_2 - n')t_2; \quad (6B)$$

where $n_1$ and $n_2$ are the indexes of refraction of the laminae; $\lambda_R$ and $\lambda_B$ are the design wavelengths for the red and blue spectral bands, respectively; and n' is the index of refraction of the medium surrounding the stripes. In other words, the thicknesses of the laminae of the first and second gratings are chosen to cause the MTF associated with each grating individually to cut-off high spatial frequency components in the red and blue images, respectively. In this regard, a double layered optical low pass filter can be designed with spectral averages $M_{cR}$ and $M_{cB}$ that are both very low by choosing $t_1$ and $t_2$ such that $\phi_1$ and $\phi_2$ are each individually equal to $\pi$ for specific wavelengths in the transmission spectra of the red and blue filters, respectively. In this case, all three cut off functions $M_{cR}$, $M_{cB}$, and $M_{cG}$ have low values and consequently are effective in suppressing aliasing artifacts.

Unfortunately the invention in U.S. Pat. No. 4,009,939 suffers from several disadvantages. The low-pass filter disclosed in this patent reduces aliasing artifacts only along one direction in the image plane. While this may be of use in color television camera systems, it is inadequate for application in electronic image pick-up devices with discrete sampling which require suppression of aliasing artifacts in two-dimensions. Furthermore, this filter would be difficult to manufacture in that two gratings each with its own precise laminae thickness must be formed and aligned with respect to one another. Finally, the unique axis of this low-pass filter along which the anti-aliasing function is achieved must be aligned properly with respect to an axis of the electronic image capture device (i.e., the x- or y-axis of the array of pixels) which means that more cost is added to the manufacture process.

U.S. Pat. No. 5,585,885 describes the use of an optical low pass filter for use in a photographic camera exposure control system. This low pass filter is comprised of circular phase components of randomly distributed convex and concave surfaces on a transparent substrate such that the height of the phase components represents a phase difference between the light passing through the phase components and the other areas of the filter that is ½ its wavelength. This phase difference corresponds to $\phi=\pi$ radians and the height h is given by the relationship $$h = \frac{0.5\lambda}{n-1} \quad (7)$$

where n is the index of the material which comprises the phase components and the phase components are assumed to be surrounded by air. The specific value of the optical wavelength λ which occurs in EQN. 7 is specified in the prior art patent only to the extent that it is characteristic of the measured light passing through the phase noise filter. The object of the invention in U.S. Pat. No. 5,585,885 is to provide a camera photometer that can precisely measure the light distribution of a secondary photo image regardless of the incidence of the light from the photographic subject when the photometric sensors have been divided into multiple units. This optical low pass filter is designed specifically to be used in a camera system whose primary image capture mechanism is not specified but whose secondary image capture system is an array of discrete photometric sensors. The filter is placed optically upstream of a secondary image-forming lens and is used to blur the image formed on the array of photometric sensors. In this way, light that is focused in the non-sensing areas between photometric sensors will be blurred enough so that the brightness of this light can be measured by the photometric sensors adjacent to these non-sensing areas. After conversion of light to electric signals, the signals are used to determine the light exposure for the primary image capture function of the camera.

U.S. Pat. No. 5,585,885 makes no mention of an application involving suppression of aliasing artifacts across broad spectral bandwidths in digital electronic capture devices. The purpose of the prior art invention is to enable accurate measurement of the brightness distribution of the photographic subject and this information is used to set the camera exposure for capture of the primary image. Clearly the purpose of this invention is distinct from that of the present invention. Furthermore, U.S. Pat. No. 5,585,885 specifies randomly distributed circular phase components having concave and convex surfaces and a diameter a defined by the relationship $$a \leq \frac{\lambda f}{T} = F_S \lambda f \quad (8)$$

where f is the focal length of the secondary photometric image-forming system, T is the photometric sensor spacing, $F_s$ is the sampling frequency associated with the photometric sensors, and λ is a wavelength of light that is characteristic of the light passing through the filter. In this case, the diameter of the phase spot is chosen to be very small in order to diffract light to very large angles thereby maximizing the possibility of collecting the light by the array of photometric sensors.

SUMMARY OF THE INVENTION

It is therefore an object of the present invention to provide an inexpensive broad spectral bandwidth optical low-pass filter which solves all of the aforementioned problems associated with prior art.

Another object of the invention is to provide a low pass optical filter for use in an electronic digital capture device to suppress aliasing artifacts over a broad spectral range while at the same time causing as little reduction as possible in the system MTF for those spatial frequencies below the Nyquist frequency.

These objects are achieved by an optical broad spectral bandwidth low-pass filter for use with an optical imaging system, comprising: a transparent substrate and material forming a plurality of transparent spots randomly placed on the substrate for producing a phase difference between a wave front transmitted through the spots and that portion of the substrate other than the spots to define a filter having a spatial sampling cut-off frequency which is approximately independent of the wavelength of light over a specific spectral bandwidth from a lower wavelength $\lambda_B$ to an upper wavelength $\lambda_R$, the phase difference satisfying the following condition $$\phi_o = \pi \quad (9)$$

where $\phi_o$ is the phase difference due to the spots at a certain specific wavelength, $\lambda_o$, such that $$\lambda_B \leq \lambda_o \leq \lambda_R \quad (10)$$

and where $\phi_o$ is given by the relationship $$\phi_o = 2\pi \frac{n_0 - n'_o}{\lambda_o} t \quad (11)$$

so that $$t = \frac{\lambda_o}{2(n_o - n'_o)} \quad (12)$$

where $n_o$ is the index of refraction of the material forming the spots at the specific wavelength $\lambda_o$; $n_o'$ is the index of refraction of the medium surrounding the spots at the specific wavelength $\lambda_o$; and t is the physical thickness of the spots.

In accordance with the present invention, an inexpensive low-pass optical filter is suitable for use in solid-state cameras with discrete image sampling. Moreover, the present invention functions as a spectrally broadband low-pass optical filter in that high spatial frequencies are sufficiently attenuated to substantially reduce or eliminate entirely aliasing artifacts for incident light over the entire bandwidth of spectral sensitivity of the solid-state imaging system.

The present invention has the following advantages.

The low-pass filter according to the present invention is designed specifically to suppress aliasing artifacts in solid state imaging devices with discrete sampling over a broad spectral band in an inexpensive way while preserving the sharpness of captured images as much as possible. U.S. Pat. Nos. 2,959,105 and 4,480,896 describe low-pass filters which are intended primarily for use in photographic systems and are designed to attenuate the green high spatial frequencies while transmitting the red and blue high spatial frequencies. U.S. Pat. No. 5,280,388, on the other hand, describes a color selective low-pass filter that attenuates high spatial frequencies in the red and blue portion of the visible spectrum while passing green high spatial frequencies. Unfortunately, none of these patents address the problem of achieving high attenuation uniformly over the red and blue spectral bands. Consequently the present invention is better suited for use in solid state imagers compared to the three prior art patents.

The present invention also avoids difficulties associated with U.S. Pat. Nos. 4,009,939; and 5,280,388. The low-pass filter described in the present invention is formed by a plurality of randomly positioned spots of random diameter. Accordingly, it is rotationally symmetric and is effective in eliminating or reducing aliasing artifacts in two dimensions regardless of the filter orientation with respect to the pixel array of the electronic image sensor. Here again the present invention is better suited for use as an anti-aliasing filter in solid-state image capture devices than the aforementioned prior art patents which can perform low-pass filtering only along one axis and/or depend on precise alignment of the filter with the axes of the electronic imager pixel array.

Yet another advantage is the ease of fabrication of the low-pass filter of the present invention. It will be appreciated that the broad spectral bandwidth anti-aliasing function of the present invention is accomplished with a relatively simple structure; namely, a single substrate with a multiplicity of randomly arrayed phase spots as shown in FIGS. 4A–C. The random spot pattern can be easily manufactured in several different ways. For example, the spot pattern can be formed in a master mold and the mold used to cast or stamp replicate plastic low-pass filters. Another means of producing the low-pass filter according to the present invention is to spin-coat photoresist on a glass substrate (quartz, for example) and photolithographically pattern the photoresist according to the pattern of the random spots. The glass substrate is then placed in a buffered oxide etch solution which transfers the spot pattern in the photoresist to the substrate followed by the removal of the photoresist. Yet another means is to deposit a thin layer of a transparent organic polymer such as PMMA onto the transparent substrate followed by evaporation of a thin inorganic etch-stop layer such as silicon dioxide. After patterning the etch-stop layer with the spot pattern using standard photolithographic processing techniques, the etch-stop pattern is transferred to the polymer using an oxygen plasma reactive ion etching technique. It will be furthermore appreciated that it is necessary to form the random spot pattern on a single surface of the transparent substrate. This is in contrast to U.S. Pat. Nos. 4,009,939 and 5,280,388 which require the formation of two separate phase gratings on two different surfaces of the same substrate or two different surfaces of two different substrates. Furthermore, the invention does not depend on materials with unique optical properties such as mentioned in the claims of prior art U.S. Pat. No. 5,280,388.

It should also be noted that low-pass optical filters with regular or periodic phase gratings such as those mentioned in U.S. Pat. Nos. 4,009,939 and 5,280,388 exhibit an additional drawback. A spurious pattern may be produced in the image plane which is an artifact of the interference generated by light transmitted through the regular gratings. This artifact is especially pronounced in cases where bright points of light are to be imaged. The low-pass filter according to the present invention, on the other hand, avoids this difficulty in that it is comprised of a random array of randomly sized spots whose interference pattern in the image plane is a nearly constant intensity halo about the image of the bright object.

Finally, it should be noted that the phase noise filter of the present invention is specifically designed to suppress broad spectral band aliasing artifacts in electronic digital capture devices. In contrast, U.S. Pat. No. 5,585,885 is designed to enable accurate measurement of brightness distributions using photometric sensor arrays for the purpose of exposure determination in photographic cameras. In this regard, the present invention has advantage over the prior art invention in that it specifies a diameter of the phase spots which causes the least amount of diffraction of light consistent with the objective of aliasing suppression. On the other hand, U.S. Pat. No. 5,585,885 specifies a phase noise blur filter with phase spot diameters specified according to EQN. 8. This diameter is much too small for the phase noise filter to be suitable for use as an anti-aliasing filter in an electronic digital image capture device since the small diameter of the phase spots causes excess diffraction of light and results in excessive blurring of the image (i.e., poor image quality). The criteria for the selection of the diameter of the phase spots and the design wavelength are quite different from those used to specify the invention in U.S. Pat. No. 5,585,885, as will become clear in the detailed description of the invention. Another advantage of the present invention with respect to U.S. Pat. No. 5,585,885 is that the present invention specifies the thickness of the phase spots in such a way that it is optimized for operation over a broad spectral bandwidth. Unfortunately EQN. 7, which is the equation given in the prior art invention for the height of the phase component, is ambiguous in that it does not specify which design wavelength must be used in order to achieve broad spectral band suppression of aliasing artifacts. The present invention has yet another advantage over U.S. Pat. No. 5,585,885 in that it allows for placement of the phase noise blur filter either in object space (i.e., between the imaging lens and the object to be photographically captured) or in image space (i.e. between the imaging lens and the image plane). Unfortunately U.S. Pat. No. 5,585,885 specifies that the blur filter must be placed in object space. The present invention allows additional flexibility in the use of the phase noise filter. For example, it allows for the possibility of designing an anti-aliasing filter that is independent of the focal length of the imaging lens which requires that the phase noise blur filter be placed in image space. This is a particularly useful advantage in the case of digital electronic image capture devices with zoom lenses. Finally, the present invention specifies phase spots of uniform thickness whereas the prior art patent describes convex and concave phase components. It is expected that uniformly thick phase spots would be more effective in diffracting the light and cheaper and easier to control and manufacture than would the phase components with variable thickness such as the convex and concave phase components described in the prior art patent.

BRIEF DESCRIPTION OF THE DRAWINGS

FIG. 2A is a schematic representation of an array of discrete pixels of a typical solid-state imager; and FIG. 2B shows the positions of the aliasing artifacts only (i.e., captured image minus the image of the test target) for the monochrome imager and for the test target shown in FIG. 1;

FIG. 3A is a schematic representation of an array of pixels with green color filters (labeled "G") on half of the pixels and red or blue color filters on the remaining half (labeled "R" or "B", respectively; and FIG. 3B shows the positions of the aliasing artifacts only (i.e., captured image minus the image of the test target) for the color imager and for the test target shown in FIG. 1;

FIG. 5A shows a phase noise filter in image space.

FIG. 9 shows plots of the measured red, green, and blue system MTF's as functions of the spatial frequency f for a Bayer-type electronic digital image capture device with $\text{MTF}_{crit}=0.10$ and $F_{SR}=62$ 1 p/mm having a phase noise anti-aliasing filter designed according to the present invention with a=313 micrometers, b=4.27 millimeters, $\lambda_o=0.450$ micrometers, t=0.37 micrometers.

DETAILED DESCRIPTION OF THE PREFERRED EMBODIMENTS

Figure 1:
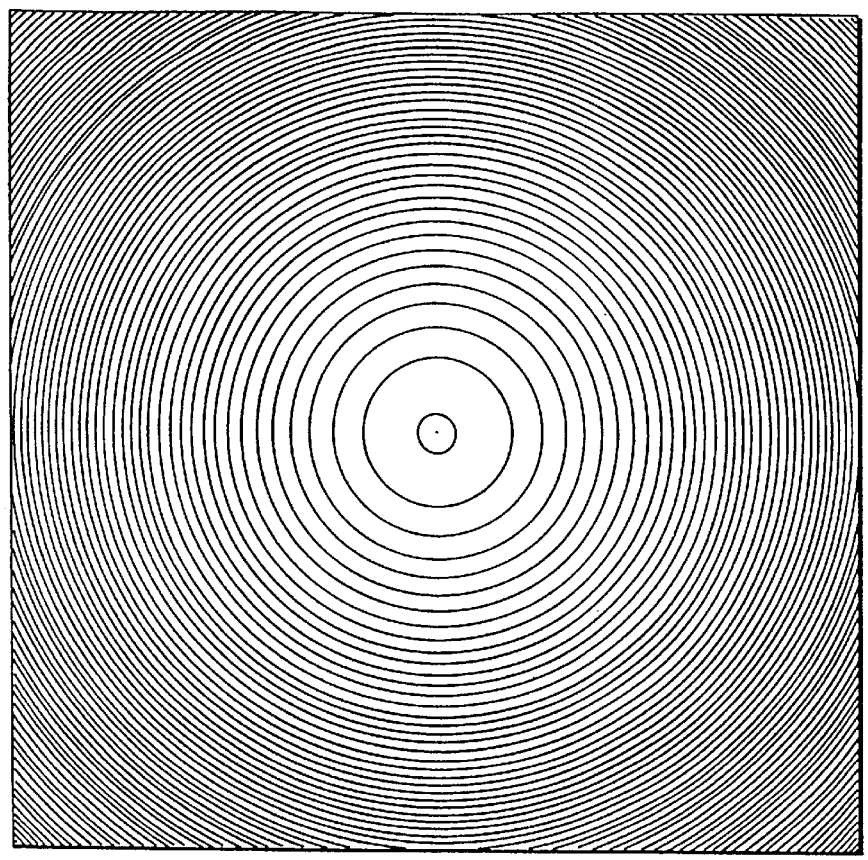
FIG. 1 shows a test target known in the prior art which is characterized by a series of concentric rings such that the spatial frequency increases linearly with radius from the center of the target.
Figure 2A:
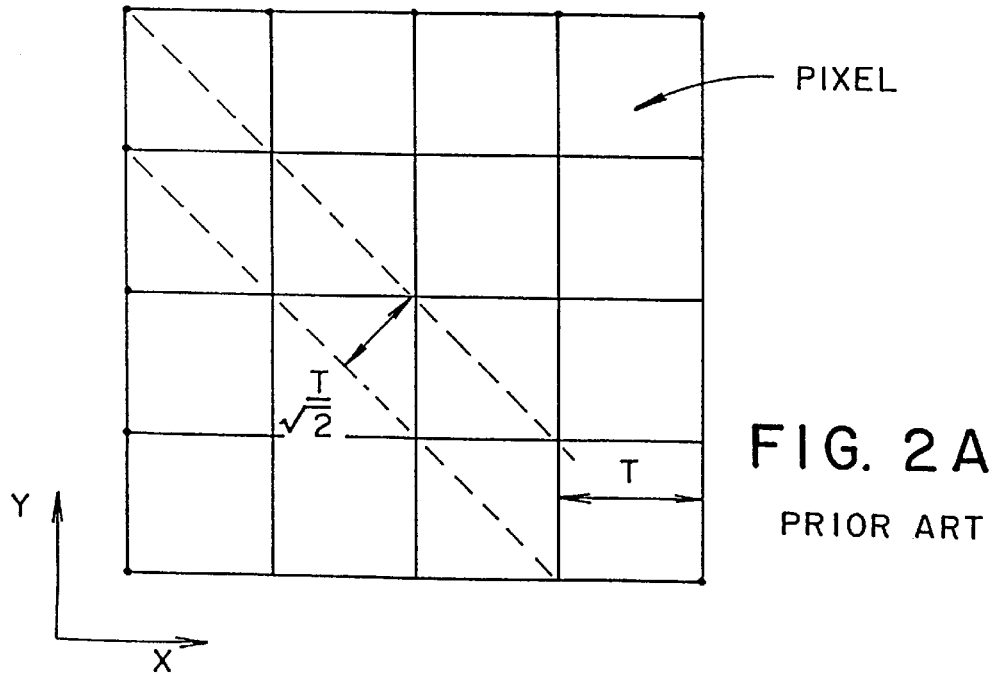
FIGS. 2A and 2B illustrate schematically the main aliasing artifacts known in the prior art for a typical monochrome solid state imager with discrete sampling.
Figure 2B:
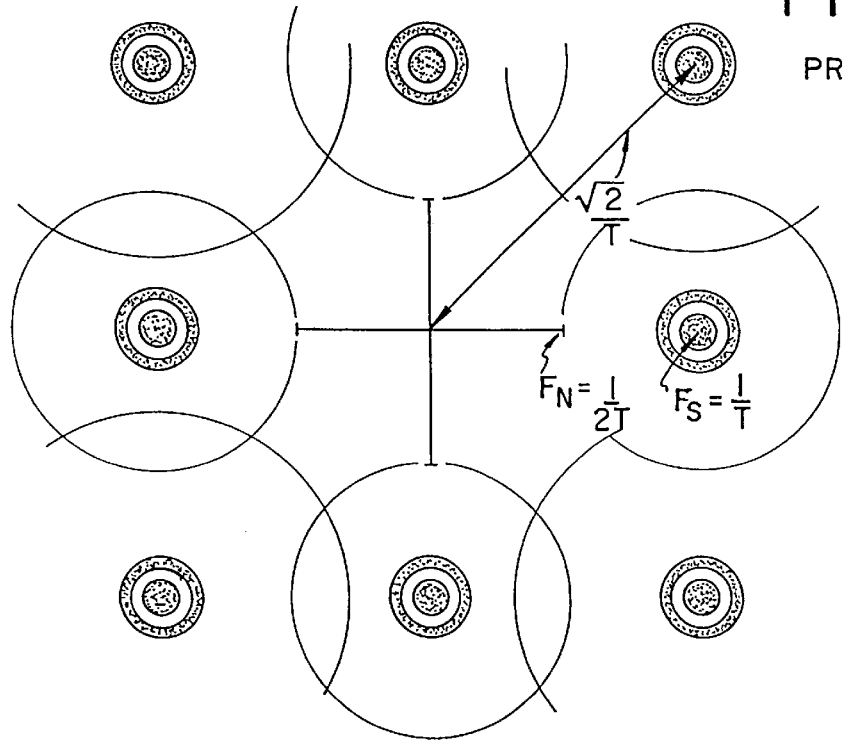
Figure 3A:
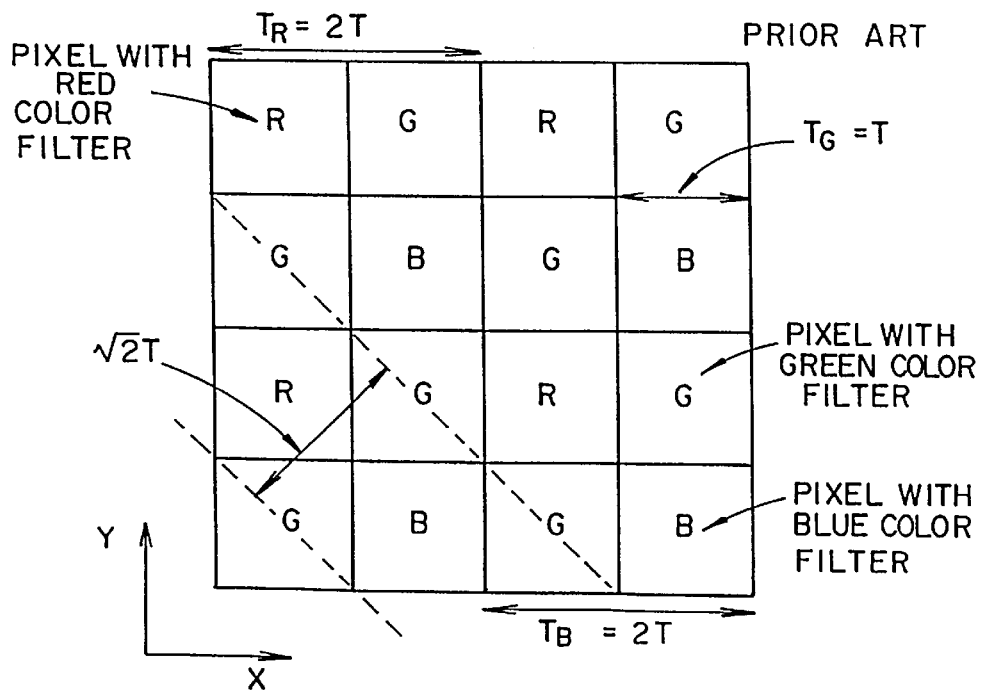
FIGS. 3A and 3B illustrate the effects of aliasing for a prior art Bayer-type color solid-state imager with discrete sampling.
Figure 3B:
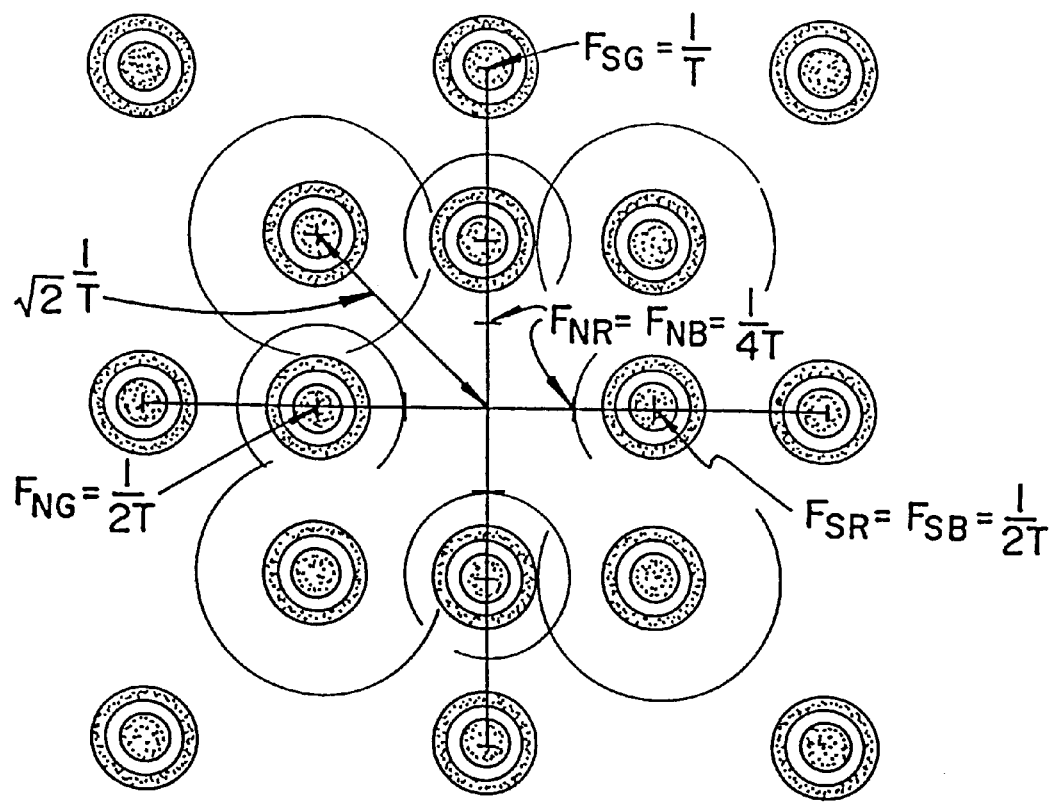
Figure 4A:
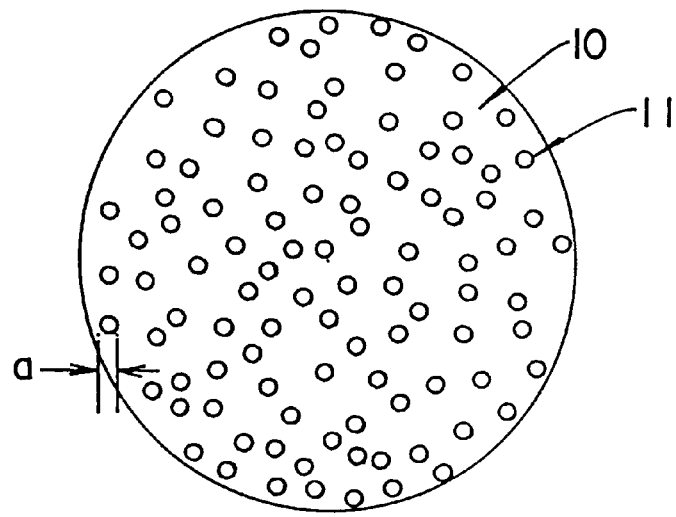
FIGS. 4A–C show front and side views of a phase noise optical low-pass filter.
Figure 4B:
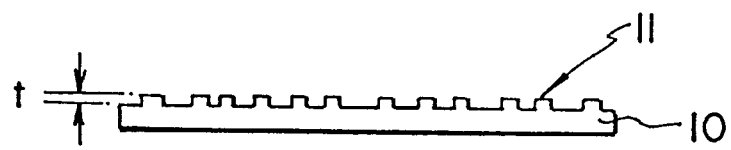
Figure 4C:
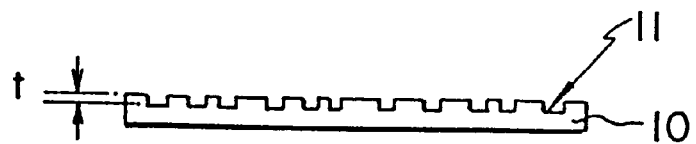
Figure 5A:
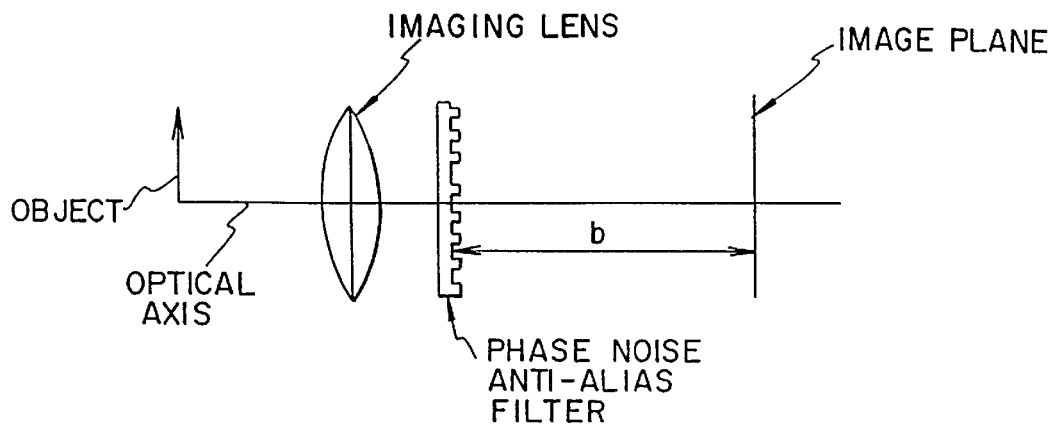
FIGS. 5A and B are schematic views of a solid-state imaging system illustrating the possible locations for the phase noise optical low-pass filter.
Figure 5B:
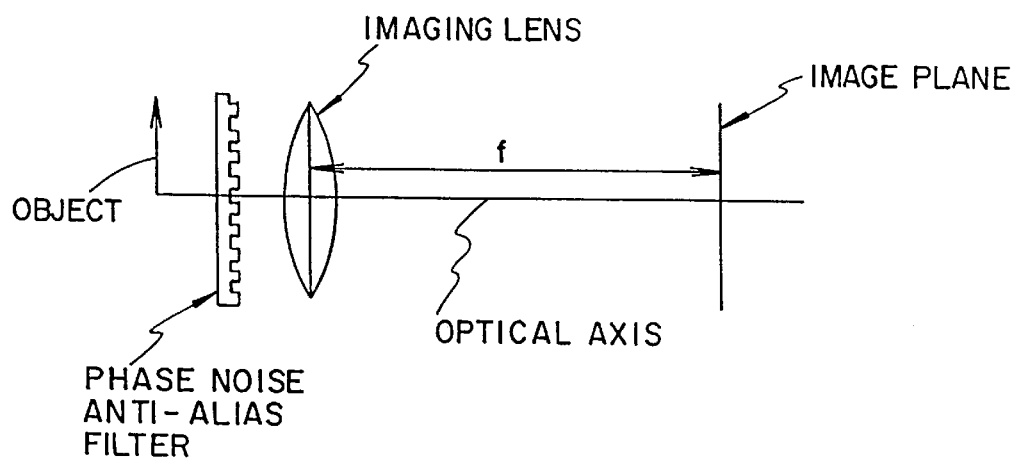
FIG. 5B shows a phase noise filter in object space.
Figure 6:
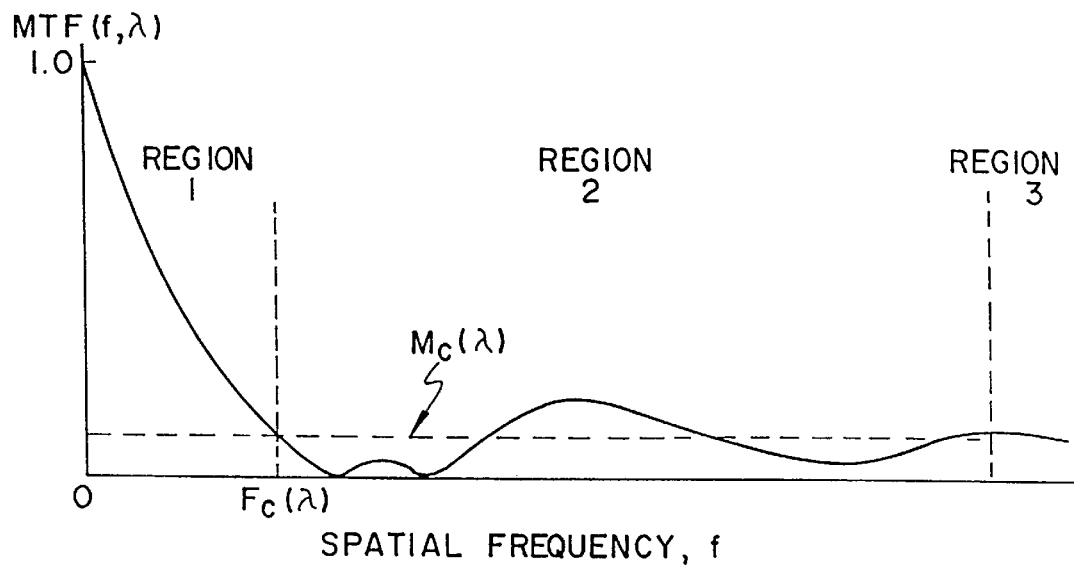
FIG. 6 shows a plot of MTF(f,λ), the modulation transfer function of the phase noise optical low-pass filter, for a particular wavelength, λ as a function of spatial frequency f.

The preferred embodiment of the invention can be specified by optimal selection of the parameters associated with the phase noise filter illustrated in FIGS. 4A–C. These parameters include 1) ξ, the fractional area of the surface of the filter that is covered by the transparent spots; 2) t, the physical thickness of the phase spots (assuming that the indexes of refraction of the phase spots and the medium surrounding the phase spots are given); and 3) a, the diameter of the phase spots. It will be appreciated that in general, the optimum blur filter for use in a solid-state imaging device with discrete sampling should exhibit sufficiently low values of the spectrally averaged high spatial frequency MTF (i.e., $M_{cR}$ etc., defined in EQN. 5) to suppress aliasing artifacts which occur at the lowest spatial frequencies subject to the condition that the MTF of the entire optical system (including the lens and the blur filter) be as large as possible for those spatial frequencies below which aliasing artifacts occur. More specifically, it will be appreciated that the optimum blur filter for use in a color solid-state imaging device with a Bayer-type color filter array (FIG. 3A) should exhibit values of $M_{cR}$ and $M_{cB}$ (defined in EQN. 5) that are low enough to suppress aliasing artifacts which occur at the red or blue sampling frequencies along the x- or y-axis of the pixel array as illustrated in FIG. 3B. It would also be desirable to design the blur filter such that the spectrally averaged values of MTF(f,λ) over the red and blue transmission bands are approximately equal for any spatial frequency. All of these optimal features can be achieved by means of the following teaching.

First of all, it will be appreciated that in order to achieve maximum aliasing suppression it is desirable to cause $M_c(\lambda)$, the MTF of the phase noise filter for large spatial frequencies, to become as close to zero as possible over the entire spectral band of interest. According to EQN. 2, this function equals zero if and only if a) ξ=0.5, where ξ is the fractional coverage of the phase spots, and b) $\phi(\lambda)=(2m+1)\pi$, where $\phi(\lambda)$ is the phase difference associated with the phase spots and m is 0 or any integer. Clearly condition b) can not be satisfied for all wavelengths simultaneously. In order to obtain the highest degree of aliasing suppression, then, it is necessary to design the phase spots so that the MTF cut-off function is minimized when averaged over the red, green, and blue spectral sensitivity functions. Setting ξ=0.5 in EQN. 2 yields the expression $$M_c(\lambda) = \frac{[1 + \cos\phi(\lambda)]}{2} \qquad (13)$$

$$= \frac{\left[1 + \cos\left(2\pi t \frac{n(\lambda) - n'(\lambda)}{\lambda}\right)\right]}{2}$$

after substitution of EQN. 1B. When EQN. 13 is substituted into EQN. 5, expressions for the MTF cut-off functions $M_{cR}$, $M_{cG}$, and $M_{cB}$ averaged over the spectral sensitivity functions, $S_R(\lambda)$, $S_G(\lambda)$, and $S_B(\lambda)$, respectively, are obtained.

Figure 7:
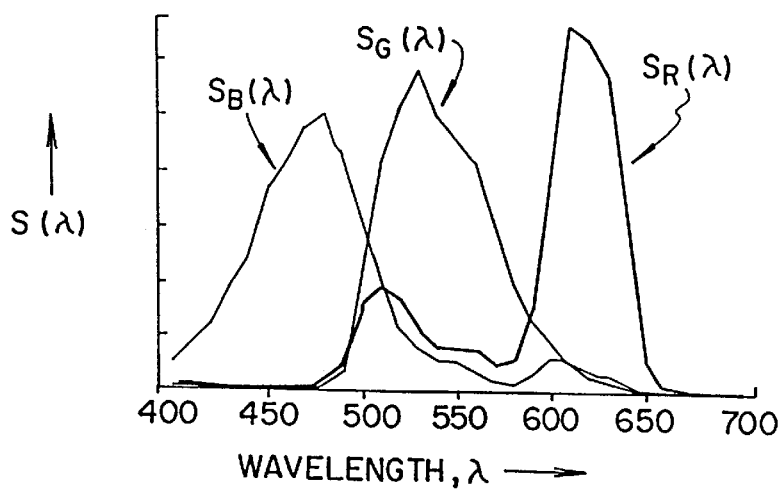
FIG. 7 shows plots of three hypothetical spectral sensitivity functions $S_R(\lambda)$, $S_G(\lambda)$, and $S_B(\lambda)$ as functions of wavelength, λ, that characterize the red, green, and blue color channels, respectively, of a color digital image capture device.
Figure 8:
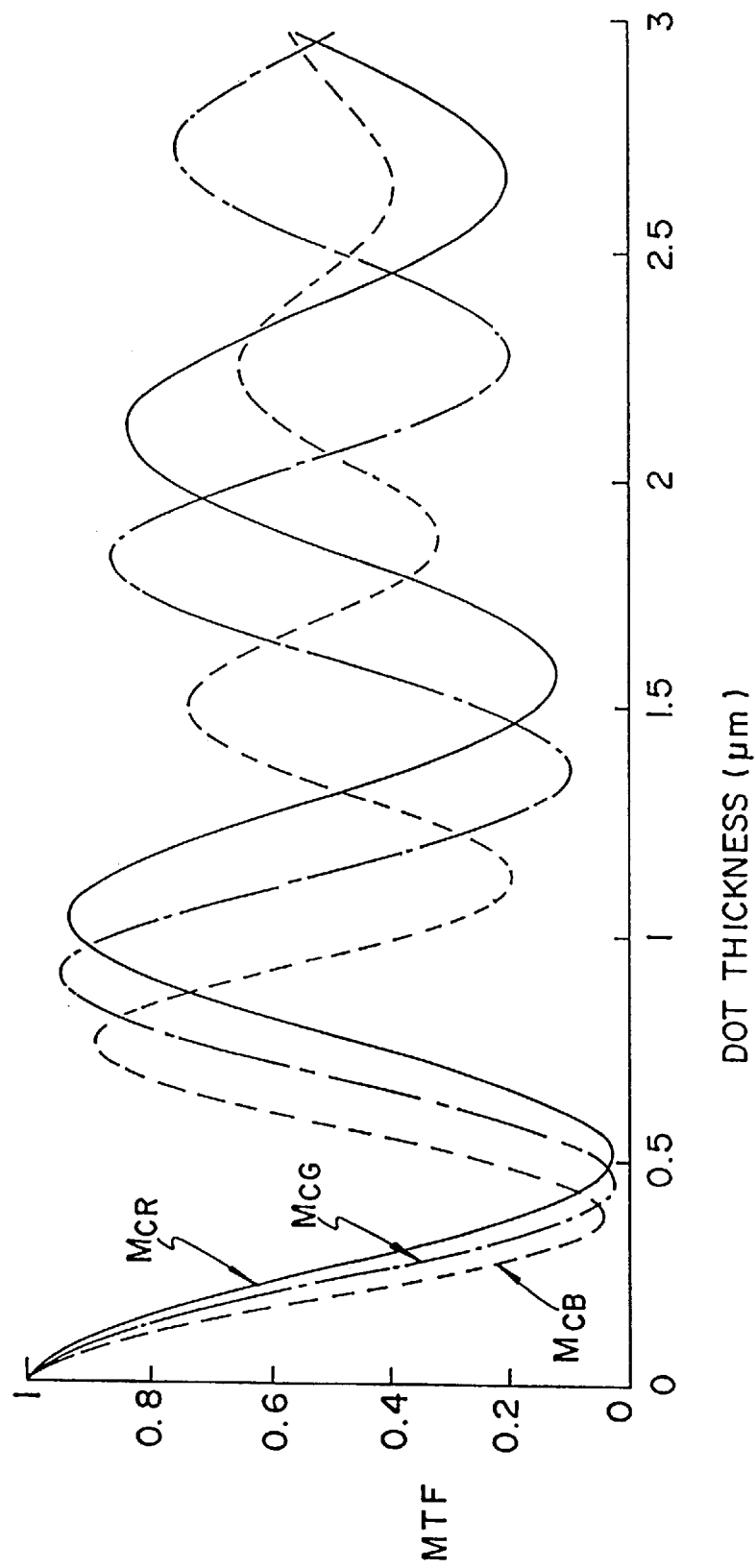
FIG. 8 shows plots of the MTF cut-off functions $M_{cR}$, $M_{cG}$, and $M_{cB}$ as functions of phase spot thickness, t, and spectrally averaged over the spectral sensitivity functions $S_R(\lambda)$, $S_G(\lambda)$, and $S_B(\lambda)$, respectively, shown in FIG. 7.

FIG. 8 shows plots of $M_{cR}$, $M_{cG}$, and $M_{cB}$ each as a function of the thickness t of the phase spots for a typical phase noise filter. The spectral sensitivity curves for the red, green, and blue channels shown in FIG. 7 were used to obtain the spectral averages indicated in EQN. 5. Furthermore, the medium surrounding the phase spots was assumed to be air (ie., n'(λ)=1 in EQN. 1B) and the index of refraction of the medium comprising the phase spots was assumed to have the following functional dependence on wavelength $$n(\lambda) = 1.5549 + \frac{0.0108}{\lambda^2}. \qquad (14)$$

The curves in FIG. 8 show that as the phase spot thickness increases, $M_{cR}$, $M_{cG}$, and $M_{cB}$ all oscillate in such a way that the local maxima steadily decrease in value while the local minima steadily increase in value. Furthermore, the local maxima and minima of a given spectrally averaged MTF cut-off function occur at values of t which differ from those of the other two functions. For example, it can be seen that for t=2.6 microns, $M_{cR}$ and $M_{cB}$ are at local minima and have values approximately equal to 0.22 and 0.42 respectively while $M_{cG}$ is at a local maximum with a value of 0.78. On the other hand, when the phase spot thickness is approximately equal to 0.4 microns, all three functions are very close to the first local minima with cut-off MTF values less than 0.1. The condition of lowest spectrally averaged MTF cut-off for the red and blue channels is clearly for t≈0.4 microns for this particular example. In general, this first local minimum corresponds to a phase difference φ=π (i.e., m=0 in EQN. 4B). The reason that all three spectrally averaged MTF cut-off functions experience their first minima at nearly the same value of t (which is also the lowest of the local minima for all three functions) is that this value of t is so small that the phase spots represent approximately ½ wavelength over the entire spectral band. The design specification for the phase spot thickness, therefore, is that for a specific spectral bandwidth from a lower wavelength $\lambda_B$ to an upper wavelength $\lambda_R$, the phase difference must satisfy the following condition $$\phi_o = \pi \qquad (9)$$

where $\phi_o$ is the phase difference due to the spots at a certain specific wavelength, $\lambda_o$, such that $$\lambda_B \leq \lambda_o \leq \lambda_R \qquad (10)$$

and where $\phi_o$ is given by the relationship $$\phi_o = 2\pi \frac{n_o - n'_o}{\lambda_o} t \qquad (11)$$

so that $$t = \frac{\lambda_o}{2(n_o - n'_o)} \qquad (12)$$

where $n_o$ is the index of refraction of the material forming the phase spots at the specific wavelength $\lambda_o$; $n_o'$ is the index of refraction of the medium surrounding the phase spots at the specific wavelength $\lambda_o$; and t is the physical thickness of the phase spots. It remains to specify the design wavelength $\lambda_o$.

Returning to FIG. 8, it can be seen that $M_{cR}$, $M_{cG}$, and $M_{cB}$ exhibit first minima at phase spot thickness values of $t_R$=0.54, $t_G$=0.46, and $t_B$=0.37 micrometer, respectively. This feature is a direct result the relationship between t and $\lambda_o$ shown in EQN. 12, the assumed dispersion relationship given in EQN. 14, and the fact that that $S_R(\lambda)$, $S_G(\lambda)$, and $S_B(\lambda)$ all represent spectral distributions that have their peaks at different values of wavelength. If the objective of the design of the phase noise filter were to select a value of t according to EQN. 12 such that $(M_{cR}+M_{cG}+M_{cB})/3$ (i.e., the average) exhibit the lowest possible value, then it would be desirable to select a design wavelength $\lambda_o$ somewhere between $\lambda_R$ and $\lambda_B$. Regarding FIG. 8 once again, it can be seen that an obvious choice for the design wavelength according to the above objective (i e., minimization of $(M_{cR}+M_{cG}+M_{cB})/3$) is the one corresponding to the thickness $t_G$=0.46 micrometer (i.e., first minimum of $M_{cG}$). This value of Ao corresponds to the wavelength $\lambda_G$ at which the peak value of $S_G(\lambda)$ occurs. However, it should be realized that the average value $(M_{cR}+M_{cG}+M_{cB})/3$ is relatively small regardless of which of the three values $t_R$, $t_G$, or $t_B$ is chosen. It should be noted that these considerations apply to an anti-aliasing phase noise filter that would be used with a color sensor. For the case of a monochrome sensor, the appropriate design wavelength, according to the above objective, clearly must be the wavelength $\lambda_{sys}$ corresponding to the peak in the overall system spectral sensitivity $S_{sys}(\lambda)$.

A better design objective to be used in the determination of $\lambda_o$ for phase noise filters in the case of Bayer-type color sensor applications is the requirement that the spectrally averaged MTF functions $$MTF_R(f) \equiv \int MTF(f,\lambda) S_R(\lambda) d\lambda \qquad (15)$$

and $$MTF_B(f) \equiv \int MTF(f,\lambda) S_B(\lambda) d\lambda \qquad (16)$$

must be approximately equal over the low spatial frequency range (i.e., from 0 1 p/mm to the canonical cut-off frequency), where MTF(f,$\lambda$) is as defined in EQN. 1A. Substituting EQN. 12 into EQN. 1B and assuming that the variation of n($\lambda$)-n'($\lambda$) over wavelength can be neglected yields $$\phi(\lambda) \approx \pi \frac{\lambda_o}{\lambda}. \qquad (17)$$

Substituting $\xi$=0.5 and EQN. 17 into EQN. 1A yields $$MTF(f,\lambda) \approx 1 - \left[1 - \cos\left(\pi \frac{\lambda_o}{\lambda}\right)\right]\left[1 - g\left(\frac{\lambda b f}{2}\right)\right] \qquad (18)$$

It is useful to define the functions $$C(f,\lambda) \equiv 1 - \cos\left(\pi \frac{\lambda_o}{\lambda}\right) \qquad (19A)$$

and $$G(f,\lambda) \equiv 1 - g\left(\frac{\lambda b f}{2}\right), \qquad (19B)$$

in order to understand the relationship between $MTF_R(f,\lambda)$ and $MTF_B(f,\lambda)$. From EQN. 18 it can be seen that MTF(f,$\lambda$)−1 is approximately proportional to the product of the functions C(f,$\lambda$) and G(f,$\lambda$). If MTF(f,$\lambda$) in EQNS. 15 and 16 is replaced by the approximation given in EQN. 18, then the resulting expressions for $MTF_R(f)$ and $MTF_B(f)$ will be approximately equal if the product C(f)×G(f,$\lambda$) is approximately independent of wavelength over the spectral band $\lambda_B$ to $\lambda_R$ for values of f between 0 1 p/mm and the canonical cut-off frequency.

If $\lambda_o$ is taken to be equal to $\lambda_B$, the ratio $\lambda_o/\lambda$ in EQN. 19A will always be greater than or equal to one according to EQN. 10. Furthermore the spectral bandwidth is such that the long wavelength $\lambda_R$ limit is typically much less than twice the short wavelength $\lambda_B$. Therefore the value of the ratio $\lambda_o/\lambda$ will typically lie between 1.0 and 2.0 for all wavelengths in the spectral band $\lambda_B$ to $\lambda_R$. The function C(f,$\lambda$) will therefore decrease monotonically as wavelength increases from $\lambda_B$ to $\lambda_R$. The function G(f,$\lambda$), on the other hand, increases monotonically with wavelength for a given spatial frequency since g($\lambda$bf/2) decreases monotonically with wavelength for values of $\lambda$bf less than a (see EQN. 3). Consequently, the product C(f,$\lambda$)×G(f,$\lambda$) is approximately independent of wavelength over the spectral band $\lambda_B$ to $\lambda_R$ for values of f between 0 and the canonical cut-off frequency. As a result, the two spectrally averaged functions $MTF_R(f)$ and $MTF_B(f)$ are approximately equal providing $\lambda_o$ is taken to be equal to $\lambda_B$ The last design parameter to be specified for the anti-aliasing phase noise filter is the phase spot diameter a. As mentioned previously, it is desirable to suppress those aliasing artifacts which occur for spatial frequencies near the appropriate sampling frequency of the digital image capture device (i.e., the sampling frequency associated with the red or blue pixels in a Bayer-type sensor). One possibility is to set $F_a(\lambda_o)$ equal to $F_{SR}$ in EQN. 3 and simply solve for a. However, this procedure does not take into account the effects of the lens MTF nor does it account for the effects of spectral averaging. Therefore the problem of selecting an optimum value of phase spot diameter a for a Bayer-type color sensor, in particular, becomes one of determining the precise relationship between $\lambda_o b F_{RS}$ and a, where $$F_{SR} = F_{SB} = \frac{1}{T_R} = \frac{1}{T_B} \qquad (20)$$

and $T_R$ ($T_B$) is the pixel pitch along the x- or y-axis of the digital image sensor for pixels with a red (blue) color filter, such that an optimum compromise is made between aliasing suppression over the appropriate wavelength bands and image sharpness when the entire optical system is taken into account. This optimum value for the phase spot diameter can be determined by one of two methods.

The first method is the empirical method. If a phase noise filter with a specific spot diameter is placed in image space, the effect of increasing the distance b between the filter and the image plane is to cause g($\lambda_o$bf/2) to decrease for a given value of f since g(x) decreases monotonically as the argument x increases (for x≦a/2). Therefore, the two spectrally averaged functions MTF$_R$(f) and MTF$_B$(f) both decrease more rapidly with spatial frequency f as the value of b increases. Conversely, small values of b cause these spectrally averaged functions to decrease less rapidly. If a series of images of a test object which exhibits aliasing artifacts is captured with a particular imaging lens and digital sensor such that the initial capture is taken with the phase noise filter as far as possible away from the image plane and subsequent captures are taken with the phase noise filter moved successively closer to the image plane, then for some position b, an optimum image will be obtained. The images captured in this manner can then be visually inspected to determine the best trade-off between aliasing suppression and image sharpness for the particular electronic image capture device tested.

EXAMPLE 1

Empirical Method for Determination of Phase Spot Diameter

A phase noise filter was fabricated, inserted into the image space of a Bayer-type digital electronic image capture device, and images were captured in accordance with the procedures for the empirical method as outlined above. The experimental conditions were as follows a=313 micrometers $\lambda_o$=0.450 micrometers $F_{SR}=F_{SB}$=67.6 1 p/mm.

Using these conditions the optimum image was obtained for b=4.96 millimeters.

The data from the empirical method suggests the relationship between $\lambda_o$b$F_{SR}$ and a to be of the form $$F_a(\lambda_o) \equiv \frac{a}{\lambda_o b} \approx 2F_{SR} \quad (21)$$

for the particular digital imaging device tested, where the definition for $F_a(\lambda_o)$ from EQN. 3 has been used. Alternatively, EQN. 21 can be used to determine the optimum phase spot diameter for other values of b, $\lambda_o$, or $F_{SR}$ $$a = M\lambda_o b F_{SR} \quad (22)$$

where M≈2. It will be appreciated that the value of M used in EQN. 2 depends on the particular digital image capture device, or more precisely, on the particular imaging lens. In general, the worse the performance of the imaging lens is (i.e. the lower imaging lens MTF at f=$F_{a(\lambda_o)}$) the higher the value of M in EQN. 22 will be. Conversely, the better the imaging lens performance the closer M will be to one. It will be further appreciated that an advantage of the empirical method is that the entire optical imaging system consisting of components such as the imaging lens as well as the phase noise filter is included in the optimization of the phase noise filter without having to know anything about the MTF's of these components.

The second method is the numerical method. In this method, the MTF of the entire optical system including the phase noise filter must be calculated or measured as a function of spatial frequency and a criterion for aliasing suppression must be specified. The criterion for aliasing suppression is that level, MTF$_{crit}$, below which the MTF must fall in order that aliasing artifacts can be considered suppressed. The spatial frequency, $F_{crit}$, at which the measured or calculated MTF becomes equal to the criterion level is determined numerically. A relationship between b, $\lambda_o$, a, and $F_{crit}$ can then be determined.

EXAMPLE 2

Numerical Method for Determination of Phase Spot Diameter

The MTF of the entire optical imaging system was measured for a Bayer-type digital image capture device with a phase noise filter. The numerical evaluation was carried out with the following conditions a=313 micrometers $\lambda_o$=0.450 micrometers MTF$_{crit}$=0.10 b=4.27 millimeters.

Under these conditions, a value of $F_{crit}$≈62 1 p/mm was observed.

Setting $F_{SR}$ equal to the value of $F_{crit}$ determined by the numerical method above yields the following relationship $$F_a(\lambda_o) \equiv \frac{a}{\lambda_o b} \approx 2.4 F_{SR} \quad (23)$$

which can be seen to be slightly different from that found in EQN. 21 using the empirical method. Of course this is to be expected since the empirical method depends on subjective assessment in order to determine the optimum relationship whereas the numerical method depends on the exact value of MTF$_{crit}$ chosen. EQN. 23 can be cast into the form of EQN. 22 with a value of M=2.4.

It will be appreciated from EQN. 22 and the fact that M≧1 for both the empirical and the numeric al methods, the condition $$a > \frac{\lambda_o b}{T_{SR}} = F_{SR} \lambda_o b \quad (24)$$

holds true. This specification is exactly opposite to the one given in connection with U.S. Pat. No. 5,585,885 as was indicated in EQN. 8

$$a \leq \frac{\lambda f}{T} = F_S \lambda f. \quad (8)$$

EXAMPLE 3

Design of Phase Noise Anti-aliasing Filter

As a final example, an anti-aliasing phase noise optical low-pass filter is designed for a Bayer-type color digital imaging device in accordance with the present invention. The design parameters are as follows:

a=313 micrometers $\lambda_o$=0.450 micrometers

MTF$_{crit}$=0.10

$T_R=T_B$=16 microns b=4.27 millimeters $n_o$=1.6080
$n'_o$=1.0.

From EQN. 12, the phase spot thickness is found to be t≈0.37 micrometers and from EQN. 20 the red sampling frequency is found to be $F_R$≈62 1 p/mm. The numerical method was used which means that $F_{crit}$ is set equal to $F_R$. The MTF of the entire system optical system including imaging lens and phase noise filter was measured and is shown in FIG. 9. It will be noted from this figure that the MTF curves for the red, green, and blue channels are nearly coincident for spatial frequencies below $F_{crit}$ and become quite small for higher spatial frequencies. This implies that $MTF_R(f)$, $MTF_G(f)$, and $MTF_B(f)$ are also nearly coincident and exhibit very low values of $M_{cR}$, $M_{cG}$, and $M_{cB}$ as indeed predicted. It will also be noted that the system MTF drops to 10% at a spatial frequency of approximately 62 1 pmm, the red sampling frequency. If $MTF_{crit}$ had occurred at some spatial frequency other than $F_R$, then it would have been necessary either to 1) move the phase noise filter to a different position b, or 2) fabricate a new phase noise filter with a different phase spot diameter a. It would then be necessary to re-measure the MTF of the modified system and compare the observed value of $F_{crit}$ to $F_R$. In principle this process would be repeated until $F_{crit}$ and $F_R$ are made to be equal to the desired accuracy.

The preceding description of the preferred embodiment assumes that the application for the phase noise anti-aliasing optical low-pass filter is a color electronic digital imaging device of the Bayer type. However it will be appreciated that the phase noise filter of the present invention is not necessarily restricted to such an application. In particular, this invention can be used to suppress aliasing artifacts in monochrome sensors or color sensors other than the Bayer type if the assignment of discreet pixel pitch is made appropriately. It is further assumed in the preceding description that the spectral bandwidth of the digital electronic capture device is limited to the visible portion of the spectrum. It will be also appreciated, however, that in general this invention applies to any portion of the optical spectrum in which the electronic digital capture device exhibits sensitivity where $\lambda_R$ refers to an upper wavelength limit and $\lambda_B$ refers to a lower wavelength limit of the spectral sensitivity band. It will be still further appreciated that although the preferred embodiment described herein makes specific reference to circular phase spots with common diameter, variations of the present invention to include arbitrarily shaped spots with arbitrary spot size distribution wherein the mean phase spot size replaces the common spot diameter can be recognized by those skilled in the art to be within the scope of the present invention.

The invention has been described in detail with particular reference to certain preferred embodiments thereof, but it will be understood that variations and modifications can be effected within the spirit and scope of the invention.

PARTS LIST 10 transparent substrate
11 transparent spots

What is claimed is:

1. An optical broad spectral bandwidth low-pass filter for use with an optical imaging system of a solid-state imager, comprising: a transparent substrate and material forming a plurality of transparent spots randomly placed on said substrate for producing a phase difference between a wave front transmitted through said spots and that portion of the substrate other than said spots to define a filter having a spatial sampling cut-off frequency which is approximately independent of the wavelength of light over a specific spectral bandwidth from a lower wavelength $\lambda_B$ to an upper wavelength $\lambda_R$, said phase difference satisfying the following condition $$\phi_o = \pi$$

where $\phi_o$ is the phase difference due to the spots at a certain specific wavelength, $\lambda_o$, such that $$\lambda_B \leq \lambda_o \leq \lambda_R$$

and where $\phi_o$ is given by the relationship $$\phi_o = 2\pi \frac{n_o - n'_o}{\lambda_o} t$$

so that $$t = \frac{\lambda_o}{2(n_o - n'_o)}$$

where $n_o$ is the index of refraction of the material forming said spots at the specific wavelength $\lambda_o$; $n_o'$ is the index of refraction of the medium surrounding said spots at the specific wavelength $\lambda_o$; and t is the physical thickness of said spots and wherein the solid state imager is a monochrome imager characterized by a system spectral sensitivity $S_{sys}(\lambda)$ which is common to all pixels in the array comprising said monochrome imager and which has a peak sensitivity at a wavelength $\lambda_{sys}$ and wherein the specific wavelength $\lambda_o$ is equal to $\lambda_{sys}$.

2. An optical broad spectral bandwidth low-pass filter for use with an optical imaging system of a solid-state imager, comprising: a transparent substrate and material forming a plurality of transparent spots randomly placed on said substrate for producing a phase difference between a wave front transmitted through said spots and that portion of the substrate other than said spots to define a filter having a spatial sampling cut-off frequency which is approximately independent of the wavelength of light over a specific spectral bandwidth from a lower wavelength $\lambda_B$ to an upper wavelength $\lambda_R$, said phase difference satisfying the following condition $$\phi_o = \pi$$

where $\phi_o$ is the phase difference due to the spots at a certain specific wavelength, $\lambda_o$, such that $$\lambda_B \leq \lambda_o \leq \lambda_R$$

and where $\phi_o$ is given by the relationship $$\phi_o = 2\pi \frac{n_o - n'_o}{\lambda_o} t$$

so that $$t = \frac{\lambda_o}{2(n_o - n'_o)}$$

where $n_o$ is the index of refraction of the material forming said spots at the specific wavelength $\lambda_o$; $n_o'$ is the index of refraction of the medium surrounding said spots at the specific wavelength $\lambda_o$; and t is the physical thickness of said spots and wherein said plurality of transparent spots are identical in size with diameter a or random in size with mean diameter a satisfying the relationship $$a = F_C \lambda_o b$$

where $\lambda_o$ is the specific wavelength, b is either the separation distance between the filter and the image plane or the focal length of the imaging lens, and $F_C$ is a spatial frequency which should lie within the range $$F_N \leq F_C \leq 3F_S$$

and preferably $$F_S \leq F_C \leq 3F_S$$

where $F_N$ and $F_S$ are the Nyquist and sampling frequencies, respectively, of the solid state imager such that $$F_S = \frac{1}{T} \text{ and } F_N = \frac{1}{2T}$$

where T is the period of the pixels along the direction of the solid state imager which direction has the greater pixel period.

3. The invention according to claim 2, wherein said optical filter is constructed such that said randomly placed transparent spots are either projections from, depressions in, or both projections from and depressions in, or index of refraction variations in the region immediately adjacent to one surface of said transparent substrate and that the total area of said spots is equal or nearly equal to the area of the portion other than said spots.

4. The invention according to claim 2, wherein said plurality of transparent spots are of arbitrary shape.

5. The invention according to claim 2, wherein said plurality of transparent spots are circular in shape.

6. The invention according to claim 2, wherein the low-pass optical filter is located between the imaging lens and the image plane of the optical imaging system and b is the separation distance between the filter and the image plane.

7. The invention according to claim 2, wherein the low-pass optical filter is located at the entrance or exit pupil of the optical imaging lens or between elements that comprise the imaging lens or directly in front of the imaging lens between the lens and the object or is an integral part of one surface of one element of the imaging lens and b is the focal length of the imaging lens.

8. The invention according to claim 7, wherein the integral low-pass optical filter is formed on or near one surface of one element of the imaging lens system by deposition or molding of material onto the surface, or etching into the surface to form a surface relief structure, or ion-diffusing ions into the surface to form an index gradient structure in the region immediately adjacent to the surface having the pattern of said randomly placed transparent spots.

9. The invention according to claim 2, wherein the solid state imager is a color solid state imager having associated with it an array of color filters such that light incident on individual pixels of the imager is filtered by one of several different color filters which comprise said color filter array and such that the sampling frequency, $F_{Sj}$, of the pixels associated with a particular color j may be different for different colors.

10. The invention according to claim 9, wherein the specific wavelength $\lambda_o$ is chosen to be equal to the lower wavelength of the specific spectral bandwidth, $\lambda_B$.

11. The invention according to claim 9, wherein the color filter array includes color filters corresponding to the three primary colors of the visible spectrum: red (j=R), green (j=G), and blue (j=B); and wherein the lower wavelength $\lambda_B$ and the upper wavelength $\lambda_R$ of the specified spectral bandwidth are such that 400 nm $\leq \lambda_B \leq$ 500nm and 600 nm $\leq \lambda_R \leq$ 700nm.

12. The invention according to claim 9, wherein a color solid state imager has values of $F_N$ and $F_S$ which are taken equal to the Nyquist and sampling frequencies, respectively, of those pixels associated with a particular color j=J $$F_S = F_{SJ} = \frac{1}{T_J}$$

and $$F_N = F_{NJ} = \frac{1}{2T_J}$$

where $T_J$ is the period of the pixels associated with color J along the direction of the color solid state imager, which direction has the greater pixel period, and furthermore $T_J$ is the largest pixel period among the different pixel periods associated with the respective different color filters of said color solid state imager.

13. The invention according to claim 2, wherein a color solid state imager has values of $F_N$ and $F_S$ which are taken equal to the Nyquist and sampling frequencies, respectively, of those pixels associated with a particular color j=J $$F_S = F_{SJ} = \frac{1}{T_J}$$

and $$F_N = F_{NJ} = \frac{1}{2T_J}$$

where $T_J$ is the period of the pixels associated with color J along the direction of the color solid state imager, which direction has the greater pixel period, and furthermore $T_J$ is the largest pixel period among the different pixel periods associated with the respective different color filters of said color solid state imager.

* * * * *